Patented July 12, 1932

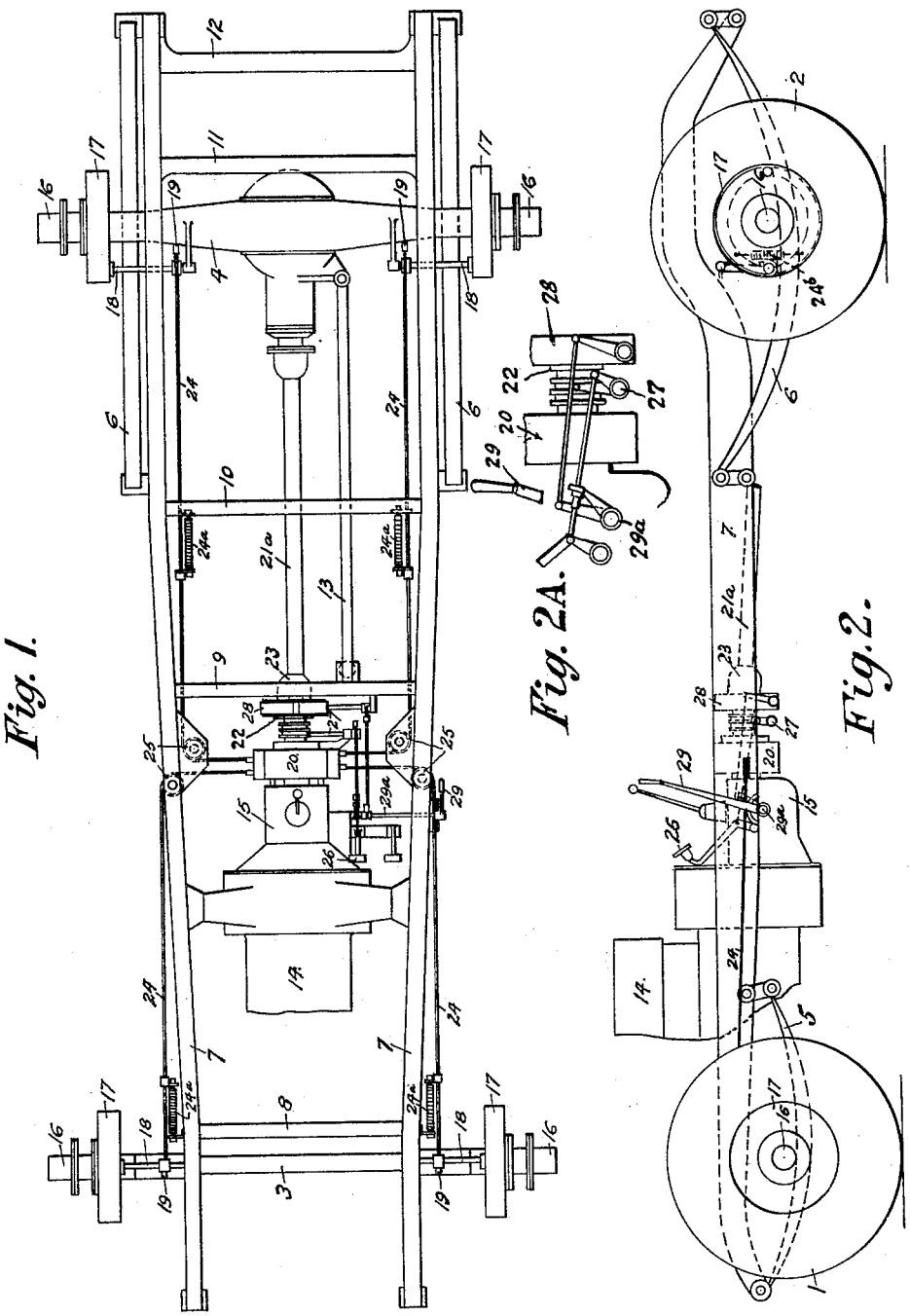

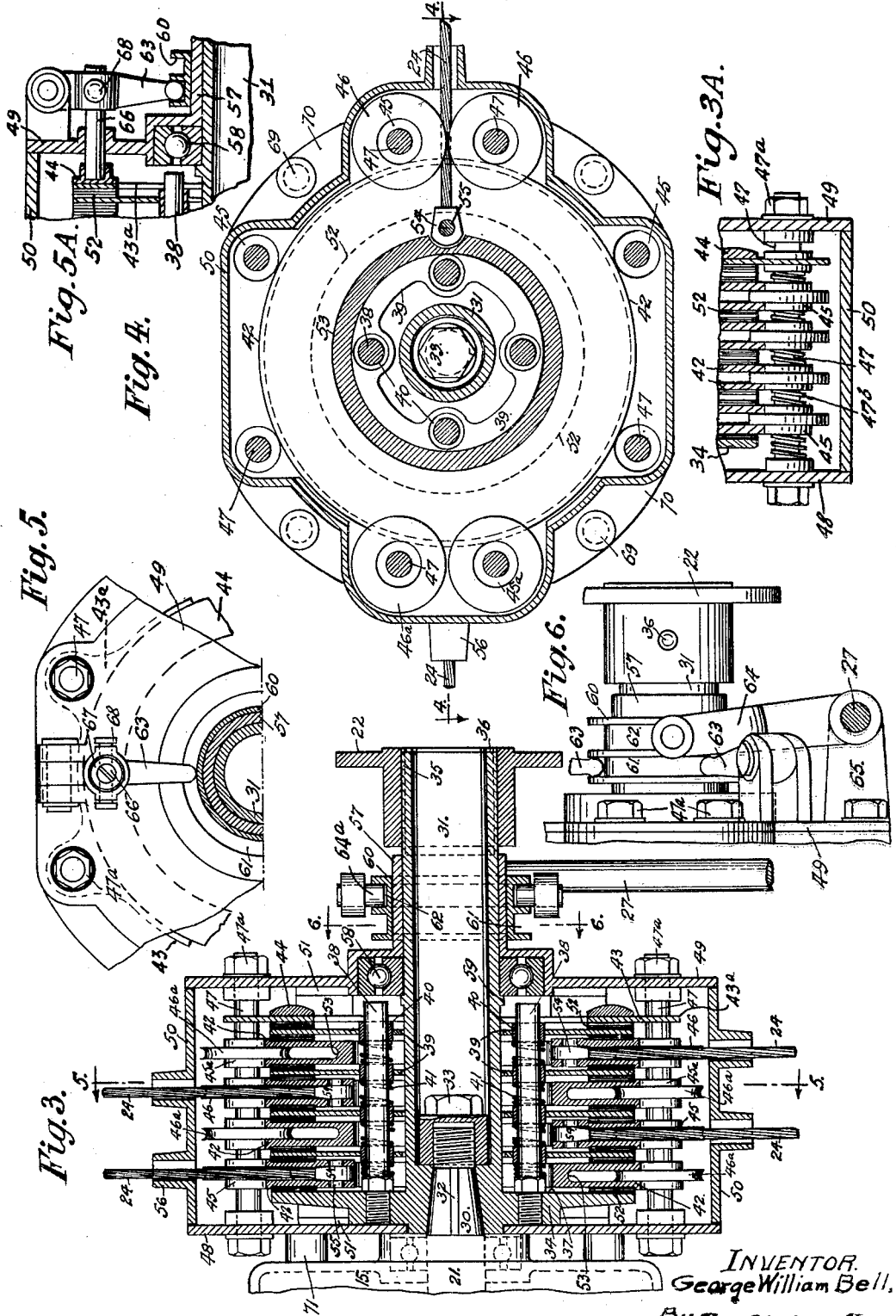

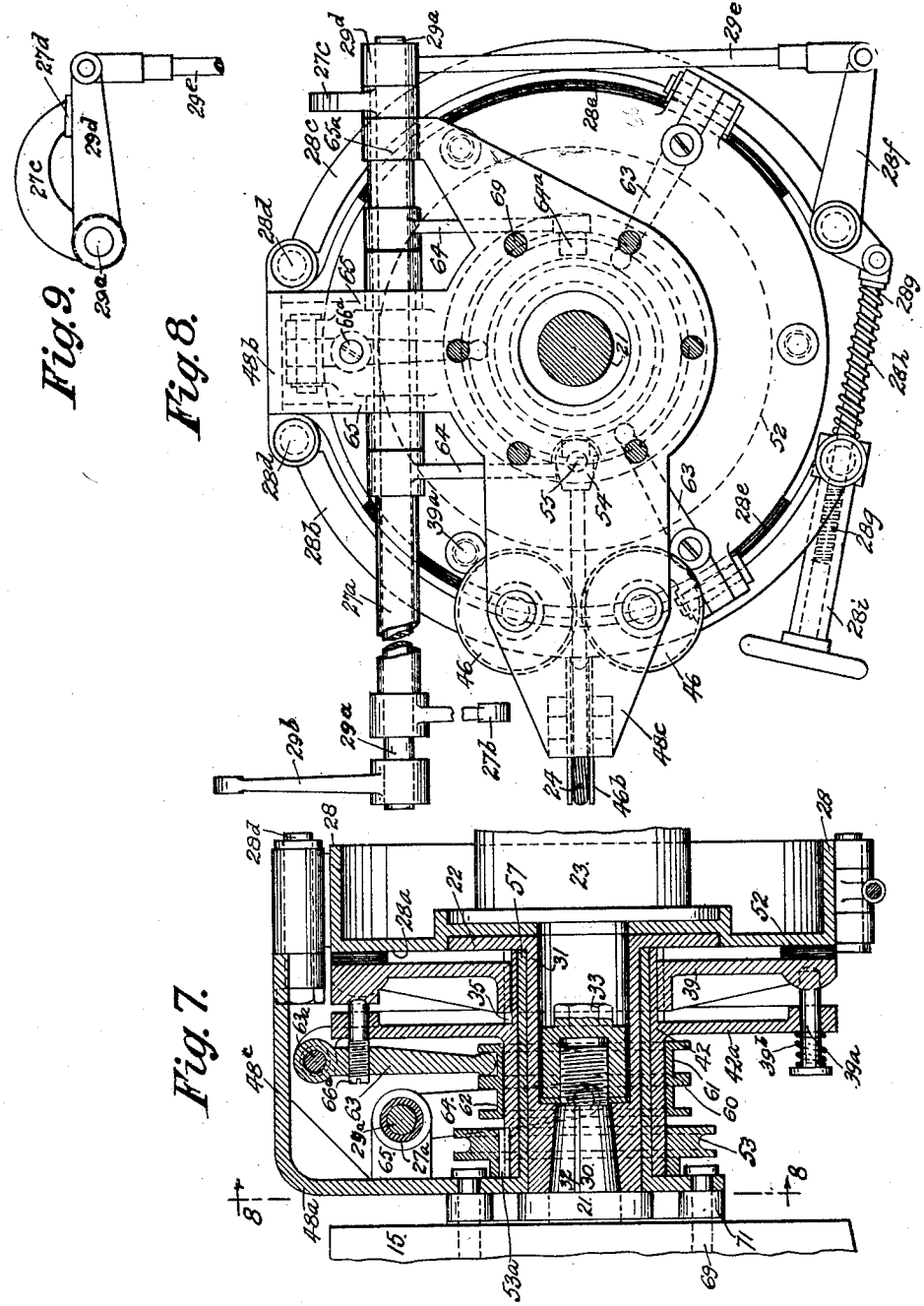

1,866,791

UNITED STATES PATENT OFFICE

GEORGE WILLIAM BELL, OF DETROIT, MICHIGAN

BRAKE SYSTEM

Application filed February 15, 1928. Serial No. 254,500.

This invention relates to brake systems and has for its object to amplify the physical effort of the driver in applying motor vehicle brakes and to eliminate the necessity of frequent adjustments of the brake mechanism to take up wear, and further to equalize in certain cases the pressure transmitted to the respective wheel brakes, automatically.

By its application the increased pressure available facilitates the control and application of the brakes and permits the use of materials of lesser coefficient of friction in the construction of the brake elements with a corresponding smoother action thereof, greater dissipation of the heat and longer life.

The device which may be described as a brake torque amplifier will be best understood by reference to the following description, when taken in connection with the accompanying drawings, which illustrate the system of amplification and equalization of the brake actuating means, and to a further illustration of a similar system arranged for amplification of the braking effort alone, without the provision of equalization, while its scope will be more particularly pointed out in the claims appended.

In the drawings:

Fig. 1 is a plan of a motor vehicle chassis equipped with a brake system and brake torque amplifier embodying automatic equalization of the pressure transmitted therefrom to the respective brakes.

Fig. 2 is a side elevational view of the same.

Fig. 2A is an enlarged fragmentary elevation showing the hand lever connection to the torque amplifier.

Fig. 3 is a sectional view showing details of the amplifier taken at line 4—4, Fig. 4.

Fig. 3A is a fragmentary view, similar to Fig. 3, showing spacing springs for the support rollers.

Fig. 4 is a cross sectional view of the same taken at 5—5, Fig. 3.

Fig. 5 is an end elevational view showing clutch levers taken at 6—6, Fig. 3.

Fig. 5A is a side view of the clutch lever shown in Fig. 5.

Fig. 6 is a side elevational view of the clutch levers and actuating yoke.

Fig. 7 is a vertical section of a brake torque amplifier and transmission brake without equalization means.

Fig. 8 is an end elevation of Fig. 7, taken at 8—8, Fig. 7, looking in the direction of the arrows.

Fig. 9 is a side elevational view of the transmission brake lever and cooperating yoke locking lever.

Referring to the drawings there is shown in Figs. 1 and 2 a portion of the chassis of a motor vehicle minus a part of the motor and steering gear. The chassis has a pair of front steering wheels 1, and a pair of driving wheels 2, conventionally represented in Fig. 2, front and rear axles 3 and 4, front and rear springs 5 and 6, and a spring supported frame comprising a pair of side members 7, connected together by cross members 8, 9, 10, 11, and 12. A torque rod 13, secured to the axle housing is pivotally connected at its front end to a cross member 9. A motor, a portion of which is shown at 14, is supported on the side members 7, and supports a clutch and transmission having a housing 15.

The steering mechanism is not shown on the drawings.

Each of the wheels may be provided with a conventional form of hub 16, mounted to turn on bearings.

Suitably secured to the wheel hubs are brake drums 17, and enclosed by the latter, brake shoes and conventional engaging members 18 rotated by levers 19.

The brake torque amplifier disposed in housing 20, is here shown at the rear of the transmission case 15 and supported therefrom.

The drive shaft 21, with its extension 31, passes through the torque amplifier housing 20, and is connected to the usual flange 22, universal joint 23, to the shaft 21a and to the rear axle 4.

The wheel brake levers 19 are each connected to the respective torque member of the amplifier, preferably by cables 24 and are guided thereto and on the chassis by pulleys 25.

The foot brake pedal 26 connected with the yoke shaft 27, engages the clutch of the torque amplifier.

A brake drum 28 is attached to the flange 22 (see Fig. 2A) of the driving shaft and is equipped with a conventional brake band and actuating mechanism, operable by the emergency hand lever 29, through shaft 29a on which there is a lever adapted to engage with the pedal connection to the clutch, for the purpose of applying the wheel brakes with the emergency brake through the action of the torque members of the amplifier, for the purpose of retaining the said brakes in engagement.

Adjustable springs 24a are secured to the chassis and clamped to the cables 24, for the purpose of returning the cable winding members of the brake torque amplifier to the normal "off" position to release the brakes.

Figs. 3 and 4 illustrate in detail the torque mechanism, shown in Figs. 1 and 2, on a larger scale, and illustrate the application of the invention applied to four wheel brakes, wherein the equalization of the pressure exerted at the respective brakes is embodied in the arrangement of the torque members.

To apply the brake torque amplifier to the conventional motor vehicle, it is necessary to extend the shaft 21 well through the transmission case 15 either by replacing it or as shown herein by adding an extension member thereto.

The drive shaft 21 terminates through the transmission case 15 with the usual tapered end 30 to which is secured the extension tubular member 31. It is held in position and alignment by key 32 and nut 33, the latter being accessible through the tube 31.

The tubular member 31 is provided at its inner end with a radially extending carrier member 34 formed integrally therewith or fixed against axial movement thereon, and on the outer end with a flanged collar 22 detachably secured thereto by splines 35 and stud 36.

To the inner circumferential face 37 of the carrier member 34, studs 38 are disposed parallel to the axis of the drive shaft and secured thereto.

On the studs 38 clutch plates 39 are carried and are axially movable on bushings 40 secured to the respective clutch plates, which engage with the studs 38. Springs 41 are disposed on the studs 38 between the carrier member 34 and the respective clutch plates 39, to separate them when the clutch pressure on the same is released.

In some cases I provide springs 47b on the shaft 47, (see Fig. 3A) disposed respectively between the walls of the housing, the support rollers and the nonrotatable plate, for the purpose of returning to and maintaining each of the respective members in their normal position in relation to the respective driving clutch plates with which they engage, when the pressure forcing them together, is released, thereby avoiding touching and so preventing any drag or noise.

Torque sheave rings 42 are disposed concentrically with and between the respective clutch plates 39, carrier member 34, and the non-rotatable ring plate 43 with which the pressure ring 44 engages, and are rotatably supported and guided on and at their outer peripheral edges, by rollers 45, and the cable guide pulleys 46 which are independently mounted and rotatable on the shaft 47.

The central openings in the rings 42 are made sufficiently large in diameter to permit the studs 38 to rotate freely within the same.

The shafts 47 also afford means for securing the rear and front parts 48 and 49 to the body 50 of the housing, which are held in position in the housing 50 by the spigot parts 51. The housing is supported concentrically with the drive shaft 21 and its extension 31. Nuts 47a on the ends of the shafts 47 secure the parts.

The torque sheave rings 42 are alike in section and dimensions and are provided at the outer circumference of their radial faces with rings 52 of frictional material, riveted thereto, having a similar coefficient of friction, and of equal area of face contact, respectively, and are arranged to engage with the faces of the driving clutch plates 39 when moved axially together.

Each torque ring 42 has formed in it between its radial faces a concentric winding drum 53, smaller in diameter than that of the periphery of the said ring. Guide pulleys 46 and 46a together with the support rollers 45 are journaled on the shafts 47, and adapted to rotate thereon. The pulleys 46 and 46a are approximately the same in width as the space formed between the inside radial faces of the torque rings 42, and radially extend between and engage with the said faces.

Both the support roller 45 and 45a and the cable guide pulleys 46 and 46a are each free to move axially on the respective support shafts 47 with the axial movement of the rings 42.

To each of the sheaves 53 of the respective torque sheave rings 42 a cable 24 is attached by means of a swivel connector 54 secured to the end of the cable 24, which is adapted to turn in the plane of the sheave 53 on a pivot pin 55 secured to the sheave 53, and to the wheel brake levers 19, respectively.

The guide pulleys 46 are grooved on their circumference and arranged vertically on each side of the cable 24 and in the same plane thereof, to guide it to the sheave 53 when the shaft 21 is rotated in either direction. The guide pulleys 46a which are similarly disposed diametrically opposite in relation to the rings 42, are retained to guide the support rollers 45 axially on the shaft 47 with the movement of the rings 42.

The rollers 45a are here shown wide enough to accommodate the said axial movement, but in some cases there is provided a roller having an enlarged diameter in the centre thereof, (see Fig. 3A) arranged to project into the groove of the ring 42, similar to that of the guide pulley 45, to move the rollers axially with the rings 42.

To provide free passage of the cables 24 through the walls of the housing 50, openings 56 are provided, with sufficient accommodation therein to allow the cables to move freely horizontally with the axial movement of the rings 42.

To support and guide the shaft extension 31, the front part 49 of the housing 50 is provided with an extension sleeve 57 embracing the drive shaft extension 31, at the inner end of which a bearing 58 is housed and held in position on the tubular drive shaft 31 by the shoulder 59.

On the outer periphery of the sleeve 57 a reciprocable collar 60 is provided with two grooves 61 and 62 formed thereon, and arranged to engage respectively with levers 63 of the clutch and the actuating clutch yoke 64, (see Figs. 5 and 6) disposed on the pedal actuating shaft 27 carried by bracket 65 on the front part 49 of the housing 50.

Screw studs 66 form adjustable means of transmitting the axial movement of the levers 63 to the pressure ring 44. The studs are screwed through and carried in the ring 67 which is pivotally supported on the lever 63 by pins 68, which afford movement to permit the studs being guided through and by the openings in the front part 49, to engage centrally the pressure ring 44 as is clearly shown in Figs. 5 and 5A of the drawings.

The brake torque amplifier housing 50 is supported and carried by the transmission case 15 and is secured thereto by bolts 69 in the flange 70 screwed in the bosses 71.

The non-rotatable ring plate 43 referred to is provided on the surface, facing the drive clutch plate 39, with friction material which is riveted thereto. The reverse face of the ring plate being adapted to engage with the pressure ring 44.

Lugs 43a are provided on the outer periphery of the ring plate 43 and openings therein through which shafts 47 pass and support it, the plate being free to move axially thereon.

The function of the non-rotatable ring plate 43 is to act as a braking element direct to the drive shaft to control the initial small movements of the wheels on the ground, due to the angle through which the drive shaft must turn before the torque clutch effectively applies the wheel brakes.

It will be apparent that the effectiveness of the stationary brake may be regulated by the number of the said plates provided and plates engaging the same on the drive shaft.

To reduce the pressure to be applied to the brake pedal to a required maximum, which will under no circumstance be wearisome to the driver, the ratio of leverage is arranged that when the pressure is applied the wheel will be close to their locking point when the vehicle is lightly loaded.

To operate the above described brakes by means of the brake amplifier, pressure is applied in the usual manner to the foot pedal, this rotates the shaft 27 and the yoke 64 so that the studs 64a engage in the groove 62 to force the collar 60 axially forward on the sleeve 57. This action forces the inner ends of the clutch levers 63 which engage in the groove 61 of the collar 60 in the same direction. This movement is transmitted to the studs 66 disposed on the levers 63 to the pressure ring 44 and axially forces the non-rotatable ring plate 43, clutch plates 39, together with the support rollers 45 and 45a and the guide pulleys 46 and 46a forward, compressing thereby the interposed springs 41, against the fixed carrier member 34; until the faces of the friction rings 52 of the torque sheave rings 42 engage with the revolving clutch plates 39 and rotate the said rings 42 on the support rollers 45 and 45a, causing the cables 24 to each be wound respectively on the sheaves 53 and thereby apply the brakes.

The intensity of the pull through the cables 24 to the respective brakes depends on the degree of pressure exerted on the foot pedal by the driver, as in the usual engine clutch of a motor vehicle. The pressure is transmitted axially through the contact surfaces of the driving plates and the driven sheave rings and any variation in the friction therebetween affects the pull exerted on the brakes.

When the pressure on the foot pedal is released the rotation of the drive shaft 21 together with the reaction of the interdisposed springs 41, force the respective clutch plates 39, rings 42 and non-rotatable plate 43 apart thereby releasing the torque pressure on the rings 42 which under the action of the springs 24a attached to the cables and the chassis, are reversely rotated to the normal "off" position as shown in Fig. 4.

Should the brakes be applied when the vehicle is backing, the rings 42 are rotated in the opposite direction by the drive shaft 21 and the cables 24 are wound on the sheaves 53 also in the opposite direction.

In this arrangement from the fact that each of the respective wheel brakes is actuated by an independent torque sheave ring member in the amplifier, and that the said rings are alike in diameter, area of contact, and other dimensions, and that the coefficient of friction of the contact friction material is substantially the same, it will be apparent that the pressure applied to the torque sheave rings will be simultaneously effective and of the same intensity on each. The pull therefore on the respective cables and brakes will be equal, establishing a mechanical equalization of the applied pressure to the respective brakes on the wheels.

Any small relative variations in the torque exerted by each of the respective torque sheave rings that may occur, say, due to the use of spring means to separate the clutch plates when the axial pressure on the same is released, may be compensated for by adjustment of the tension of the respective "pull back" springs 24a referred to, so that the effective pull on each of the brakes to be equalized is substantially the same.

Any heat that may be generated between the respective members of the amplifier will have the same rate of dissipation therefrom, so that if the coefficient of friction is modified thereby it will not materially affect the equalization referred to.

It is not essential that special friction material be used on the torque sheave rings. These may in certain cases be of suitable metal and may be operated wet or dry without departing from the scope of this invention.

Further I do not confine myself to the particular manner of supporting the torque sheave rings herein shown, but may support them in other ways, for example, as shown in Figs. 7 and 8, on a fixed bearing sleeve disposed concentrically therewith, on which the winding sheaves may be carried and rotated.

Due to winding the cable on the respective torque sheave rings all wear of the brakes and stretch of the cables are taken up automatically.

To hold the wheel brakes engaged, when the emergency brake is applied a lever attached to the shaft thereof, engages with a clamp disposed on the foot pedal connection to the clutch on the amplifier, forces and locks the latter in the "on" position.

The emergency brake mechanism (see Figs. 2 and 2A) may be alternatively arranged to engage with the cables or connecting means to the respective wheel brakes from the amplifier, to apply the same without interfering with the relative arrangement of the parts of the invention, as will clearly appear from Fig. 2, of the drawings.

Referring now to Figs. 7, 8, and 9 which illustrate a similar system of amplifying the braking effort, minus the provision for equalization of the pull to each of the respective wheel brakes, described above, the drive shaft 21 which passes through the transmission case 15 terminates in a tapered end 30. A tubular extension member 31 is secured thereto by key 32 and nut 33, the latter accessible therein. The outer end of the tube 31 is provided with a flange 22 to which is secured the brake drum 28 and the conventional universal joint 23 of the transmission shaft. A bracket 48a is secured to the transmission case 15 by bolts 69 through the bosses 71 and has an extension support sleeve 57 adapted to form a bearing for the extension member 31.

Mounted on the outer periphery of the said support sleeve 57 is an annular rotatable sleeve of the torque member 42, having at its inner end a winding sheave 53, secured by key 53a. The outer end is provided with splines 35 which engage with and support an axially movable clutch plate 39 adapted to engage with the radial face 28a of the brake drum 28 and to rotate the torque sleeve 42 and sheave 53. The ring 52 of frictional material is riveted to the outer circumference of the clutch plate 39 and adapted to engage with the radial face 28a of the brake drum 28.

Clutch levers 63 are fulcrumed and supported on the outer circumference of the flange 42a and adapted to engage in the groove 61 with the axially movable collar 60 which is annularly supported on the torque sleeve 42, and is adapted to engage the clutch plate 39 through adjustable studs 66a with the brake drum, forming the clutch mechanism.

To axially move the collar 60 on its sleeve 42, in order to operate the clutch mechanism, there is provided the yoke levers 64 and studs 64a which engage in the groove 62 of the collar 60; the yoke levers 64 are secured to the rotatable tubular shaft 27a to which the lever 27b is also attached and connected to the actuating pedal 26. The shaft 27a is suitably supported by bracket 65 and extension 65a.

Springs 39b are disposed between the face of the torque flange 42a and the heads of the studs 39a which are attached to the clutch plate 39, arranged and adapted to axially disengage the clutch plate 39 from the brake drum face 28a when the pressure is released from the clutch mechanism.

An extension 48b is provided on the bracket 48a to support the brake bands 28b and 28c by means of the fulcrum pins 28d. The brake bands are lined with frictional material 28e.

To guide the cable 24 onto the sheave 53 when the latter is rotated in either direction by the drive shaft, there are provided suitable pulleys 46, journaled on and carried by the bracket extension 48c on each side of the cable. The pulley 46b is journaled on and carried by the bracket at right angles thereto, to guide the cable to the brake lever on the cross shaft attached to the chassis.

To apply the transmission brake 28, which in this case is operated by the hand lever 29, (Figs. 1 and 2) when the latter is forced forward by the driver, the lever 29b on the shaft 29a is also forced forward, rotating the shaft and the lever 29d in a counter-clockwise direction when viewed from the end on which the lever 29d is secured, to raise the connecting rod 29e and the actuating bell-crank lever 28f and actuates the screw rod 28g to contract the brake bands 28b and 28c on the drum 28.

The spring 28h disposed on the screw rod 28g, forces the said brake bands apart and frees the drum 28 when the hand lever 29 is released by the driver.

The adjustable screw sleeve 28i permits the wear of the brake to be taken up and adjustments made by turning the hand wheel thereon.

To apply and lock the wheel brakes actuated through the amplifier, with the application of the hand lever, there is provided a lever 27c (Fig. 9) having a projection 27d adapted to engage with the lever 29c and be rotated thereby so actuating through the tubular shaft 27a the yoke of the clutch mechanism of the amplifier to engage the torque member and driving member disposed on the drive shaft.

In lieu of the springs 24a the usual brake pull-back springs 24b, (see Fig. 2) may in certain cases be utilized for returning the torque sheave rings to their normal "off" position.

This latter system may be applied to actuate brakes having the conventional mechanical equalizers embodied therewith.

It may also be applied to the fluid brake systems in which case the torque sheave member is connected to the piston of the master fluid motor to operate it and supply fluid under pressure to the respective brake actuating motors, and this in a manner without departing from the scope of this invention.

What I claim as new is:—

1. An apparatus of the character described having in combination a motor vehicle having a running gear including wheels, a drive shaft connected therewith, fixed and movable brake members associated with each wheel, a separate cable connected individually with each of said movable brake members, a separate cable take-up means independently supported on the frame of the vehicle and connected with each of said cables, and means associated with said drive shaft for actuating said cable take-up means.

2. An apparatus of the character described having in combination a motor vehicle having a running gear including wheels, a drive shaft connected therewith, fixed and movable brake members associated with each wheel, a separate cable connected individually with each of said movable brake members, a separate cable take-up means independently supported on the frame of the vehicle and connected with each of the said cables, and means concentric with the said drive shaft for actuating said cable take-up means in either direction.

3. An apparatus of the character described having in combination a motor vehicle having a running gear including wheels, a drive shaft connected therewith, fixed and movable brake members associated with each wheel, a separate cable connected individually with each of said movable brake members, a separate cable take-up means independently supported on the frame of the vehicle and connected with each of the said cables, means associated with the said drive shaft for actuating said cable take-up means, and a fixed cable throat positioned closely adjacent said cable take-up means.

4. An apparatus of the character described having in combination a motor vehicle having a running gear including wheels, a drive shaft connected therewith, fixed and movable brake members associated with each wheel, a separate cable connected individually with each of said movable brake members, an individual cable take-up sheave supported on the frame of the vehicle, connected with each of said cables, and friction drive means for said sheaves supported concentrically of said drive shaft and spaced therefrom.

5. An apparatus of the character described having in combination a motor vehicle having a running gear including wheels, a drive shaft connected therewith, fixed and movable brake members associated with each wheel, a cable connected with each of said movable brake members, an individual cable take-up sheave supported on the frame of the vehicle, connected with each of said cables, friction drive means for said sheaves supported concentrically of said drive shaft and spaced therefrom, and a clutch for operating said friction drive means.

6. An apparatus of the character described having in combination a motor vehicle having a running gear including wheels, a drive shaft connected therewith, fixed and movable brake members associated with each wheel, a cable connected with each of said movable brake members, an individual cable take-up sheave supported on the frame of the vehicle, connected with each of said cables, friction drive means for said sheaves supported concentrically of said drive shaft and spaced therefrom, a clutch for operating said friction drive means and means for actuating the said clutch.

7. An apparatus of the character described having in combination a motor vehicle having a running gear including wheels, a drive shaft connected therewith, fixed and movable brake members associated with each wheel, a cable connected with each of said movable brake members, an individual cable take-up sheave, connected with each of said cables, friction drive means for said sheaves, and means associated with said drive shaft for applying friction axially to said sheaves at a greater radial distance than the radius of the cable path.

8. An apparatus of the character described having in combination a motor vehicle having a running gear including wheels, a drive shaft connected therewith, fixed and movable brake members associated with each wheel, a separate cable connected individually with each of said movable brake members, an individual cable take-up sheave supported on the frame of the vehicle, connected under initial tension with each cable radially to the sheave axis, and friction drive means for said sheaves.

9. In a motor vehicle having a rotatable drive shaft, brake drums, brake shoes and means for engaging the brake shoes and drums, the combination with a shaft rotated by the drive shaft, a drive member fixed against axial movement thereon and clutch driving means axially movable disposed on and rotated thereby, torque sheave means supported on the frame of the vehicle adapted to be disposed concentric to and spaced from said drive shaft, means for supporting the said torque sheave means free of contact with the drive shaft, clutch means axially movable arranged to frictionally engage and disengage the clutch driving means and the torque sheave means, connecting means individually attached respectively to the torque means and the brake engaging means, pressure control means to operate the clutch means and means for returning the rotatable torque means to their respective normal "off" position when the pressure on the control means is released.

10. In a motor vehicle having a rotatable drive shaft, brake drums, brake shoes and means for engaging the brake shoes and drums, the combination with a shaft rotated by the drive shaft, a drive member fixed against axial movement thereon and clutch driving members axially movable disposed on and rotated thereby, torque members concentric to and respectively adapted to be rotated frictionally by the clutch driving members, sheaves supported on the frame of the vehicle attached respectively to each of the torque members, clutch means axially movable adapted to frictionally engage and disengage the clutch driving members and the torque members, flexible connecting means respectively attached individually to each of the sheaves and adapted to be wound in either direction thereon, and individually to each of the respective wheel brake engaging means, pressure control means arranged to frictionally engage and disengage the driving and driven members of the clutch assembly when the same are thereby axially moved together, and means for reversing the direction of rotation of the torque sheave members respectively to their normal "off" position when the said members are released from frictional engagement with each other.

11. In a motor vehicle having a rotatable drive shaft, brake drums, brake shoes and means for engaging the brake shoes and drums, the combination with a shaft rotated by the drive shaft, a drive member fixed against axial movement thereon and clutch driving members supported by and axially movable thereon and rotated thereby, rotatable torque sheave members respectively disposed between the said clutch driving members, and frictionally engageable therewith, a casing disposed around the shaft and clutch assembly, means attached to the casing adapted to support the respective rotatable torque sheave members concentric with the clutch driving members, connecting means respectively attached to each of the sheaves of the torque members adapted to be wound in either direction thereon, and to the brake engaging means, pressure control means arranged to frictionally engage the driving and driven members of the clutch assembly when the same are axially moved together, and means for reversing the direction of rotation of the torque sheave members respectively to their "off" position when the said members are released from frictional engagement with each other.

12. In a motor vehicle having a rotatable drive shaft, brake drums, brake shoes and means for engaging the brake shoes and drums, the combination with a shaft rotated by the drive shaft, a drive member fixed against axial movement thereon and clutch driving members axially movable disposed on and rotated thereby, a casing disposed in the line of the drive shaft adapted to contain the operating members of the clutch assembly, means attached to the casing arranged to support the respective sheave members concentric with the clutch driving members, clutch means arranged to axially engage and disengage the said members, flexible means having swivel connections attached to each of the respective torque sheave members, and to each of the respective wheel brake engaging means, guide means disposed in and supported by the casing in the plane of and adjacent to the sheaves, pressure control means adapted to axially move and frictionally engage and disengage respectively the driving and driven members of the clutch assembly, and adjustable means for returning the said sheave members to their normal "off" position when the pressure thereon is released.

13. In a motor vehicle having a rotatable drive shaft, brake drums, brake shoes and means for engaging the brake shoes and drums, the combination with a shaft rotated by the drive shaft, a drive member fixed against axial movement thereon and clutch driving members supported by and axially movable thereon and rotated thereby, rotatable torque sheave members respectively disposed between the said clutch driving members, a casing disposed around the shaft and clutch assembly, means attached to the casing adapted to support the respective rotatable sheave members concentric with the clutch driving members, a non-rotatable ring plate and pressure ring supported by the casing concentric with the clutch driving members axially movable and engageable with the latter and the clutch actuating control members, connecting means respectively attached to each of the sheaves of the torque members adapted to be wound in either direction thereon, and to the brake engaging means, pressure control means adapted to frictionally engage the driving members, torque sheave members and the non-rotatable plate and pressure ring, and means for reversing the direction of rotation of the torque sheave members respectively to their "off" position when the said members are released from frictional engagement with each other.

14. In a motor vehicle having a rotatable drive shaft, brake drums, brake shoes, and means for engaging the brake shoes and drums, the combination with a shaft rotated by a drive shaft, a drive member fixed against axial movement thereon and clutch driving members supported by and axially movable thereon and rotated thereby, torque sheave members supported on the frame of the vehicle operable by the driving members, clutch means arranged to axially engage and disengage the driving and driven members, the sheave members being arranged in pairs, each of the pairs having similar characteristics, dimensions, number of engaging surfaces, and the same coefficient of friction, arranged and adapted to each produce substantially an equal degree of torque thereby, separate means connecting each member of the pair individually to the respective brake engaging means of the wheels on the same axle, pressure control means adapted to actuate the clutch means for the purpose of engaging and disengaging the driving and driven members of the clutch assembly and means for returning the respective torque sheave members to their normal "off" position when the control pressure is released.

15. An apparatus of the character described having in combination a motor vehicle having a running gear including wheels, a drive shaft connected therewith, fixed and movable brake members, a cable connected with each of the said movable brake members, cable take-up means connected with each of said cables, supporting means for said take-up means on the frame of the apparatus, and means associated with the said drive shaft for actuating said cable take-up means.

16. An apparatus of the character described having in combination a motor vehicle having a running gear including wheels, a drive shaft connected therewith, fixed and movable brake members, a cable connected with each of the said movable brake members, cable take-up means connected with each of said cables, supporting means for said take-up means on the frame of the apparatus, and means associated with the said drive shaft for actuating said cable take-up means in either direction.

17. An apparatus of the character described having in combination a motor vehicle having a running gear including wheels, a drive shaft connected therewith, fixed and movable brake members, a cable connected with each of the said movable brake members, cable take-up means connected with each of said cables, supporting means for said take-up means on the frame of the apparatus, means associated with the said drive shaft for actuating said cable take-up means, and cable guide means adapted to keep the cable in the plane of the cable take-up means positioned closely adjacent to the latter.

18. An apparatus of the character described having in combination a motor vehicle having a running gear including wheels, a drive shaft connected therewith, fixed and movable brake members, a cable connected with each of the said movable brake members, cable take-up means connected with each of said cables, supporting means for said take-up means on the frame of the apparatus, said cable take-up means being arranged in pairs, respectively associated with each brake on the same axle, having substantially equal frictional torque effect and force transmitted to the said cables, when engaged with the said driving members and clutch means for operating said drive means.

19. A motor vehicle having in combination a running gear including wheels, a drive shaft, individual brake members on the wheels, a friction element connected with a drive shaft, means connecting the wheel brake members to certain of the friction elements associated with the drive shaft and supported on the frame independently thereof, and friction means associated with the frame of the vehicle adapted to engage the friction elements associated with the drive shaft to cause initial braking action between the frame and the drive shaft, and thereafter to produce secondary braking action between the elements on the drive shaft and the wheel brake elements.

20. A motor vehicle having in combination a running gear including wheels, a drive shaft, friction members supported on the frame of the vehicle and associated in spaced relation to said drive shaft, friction members non-rotatably mounted on said drive shaft, individual brake members on the wheels connected with the friction members associated with the drive shaft, a friction brake member non-rotatably mounted on the frame, and means for engaging said last mentioned friction member with the friction elements non-rotatably mounted on the drive shaft to apply initial braking action between the frame and the wheels through the drive shaft and thereafter to produce secondary braking action between the drive shaft and wheels through the friction members non-rotatively mounted on the drive shaft acting against the friction members associated with the drive shaft and connecting with the wheels.

21. An apparatus of the character described having in combination a motor vehicle having a running gear including wheels, individual brake elements on each of said wheels, a cable connected with each individual brake element, a drive shaft, friction disc elements non-rotatably mounted on said drive shaft and slidable longitudinally thereof, friction sheaves individually connected with each of said cables and supported on the frame of the vehicle for radial and for longitudinal movement intermediate said discs on said drive shaft, and a pressure disc supported for longitudinal movement on the frame of the vehicle and adapted to act frictionally against the disc on the drive shaft to retard the vehicle and engage the discs and sheaves to bring the wheel braking elements into action.

In testimony whereof I affix my signature this 11th day of February, 1928.

GEORGE WILLIAM BELL.